No. 862,186. PATENTED AUG. 6, 1907.
W. R. McKEEN, Jr.
POWER CONTROLLING MECHANISM.
APPLICATION FILED DEC. 19, 1905.

UNITED STATES PATENT OFFICE.

WILLIAM R. McKEEN, JR., OF OMAHA, NEBRASKA.

POWER-CONTROLLING MECHANISM.

No. 862,186.      Specification of Letters Patent.      Patented Aug. 6, 1907.

Application filed December 19, 1905. Serial No. 292,446.

*To all whom it may concern:*

Be it known that I, WILLIAM R. MCKEEN, Jr., residing at Omaha, in the county of Douglas and State of Nebraska, have invented certain new and useful Improvements in Power-Controlling Mechanism, of which the following is a full, clear, and exact description, such as will enable others skilled in the art to which it appertains to make and use the same.

This invention relates to power controlling mechanism.

One of the objects thereof is to provide efficient and readily manipulated means of control for power transmitting mechanism.

Another object is to provide controlling means of the above type adapted to be operated with a minimum of manual labor.

Another object is to provide practical controlling means of the type first mentioned which shall be of compact construction and thoroughly reliable action.

Another object is to provide means of the above types adapted for use in connection with motor cars.

Other objects will be in part obvious and in part pointed out hereinafter.

The invention accordingly consists in the features of construction, combinations of elements and arrangement of parts which will be exemplified in the mechanism hereinafter described and the scope of the application of which will be indicated in the following claims.

In the accompanying drawings, wherein is shown one of various possible embodiments of my invention.

Similar reference characters refer to similar parts throughout the several views.

This invention will be most readily understood if the following facts be borne in mind: In the case of self propelled vehicles of various types and particularly those adapted to travel upon rails, the cost to the operating parties due to accidental injuries both within and without the vehicle is often so high as to bear a considerable proportion to the total running expenses. This is peculiarly true in the case of cars of various types driven upon small railways and the branch lines of larger systems in which, on account of the comparatively small traffic, it is inexpedient to take the precautionary measures, as the elimination of grade crossings and provision of gates, which obtain in the case of large trunk lines. If this heavy item of expense is to be reduced, it is essential that the car be under instant control, and that it be possible to stop the same by the simplest manipulation of the most reliable mechanism. This is true even in the case in which skilled engineers are employed, as experience has proved that where it is necessary to manipulate a number of parts with the greatest speed, as to avoid accident, there is a likelihood of confusion arising, irrespective of the character of the engineer or motorman. Moreover, in the case of the small lines above referred to, in which local traffic is catered to rather than express service, the frequent stops render it of high importance that both the starting and stopping operations be performed in the shortest practicable space of time. Another feature of interest at this point is that in the case of heavy power transmission mechanism, if manual energy be depended upon for throwing the parts, not only is there a considerable expenditure of labor required, but there is considerable amount of time consumed in putting forth the required effort, and this often in the case where an instant's delay may result in accident. The above and other defects are avoided and many positive advantages attained in constructions of the nature of that hereinafter described.

Figure 1:
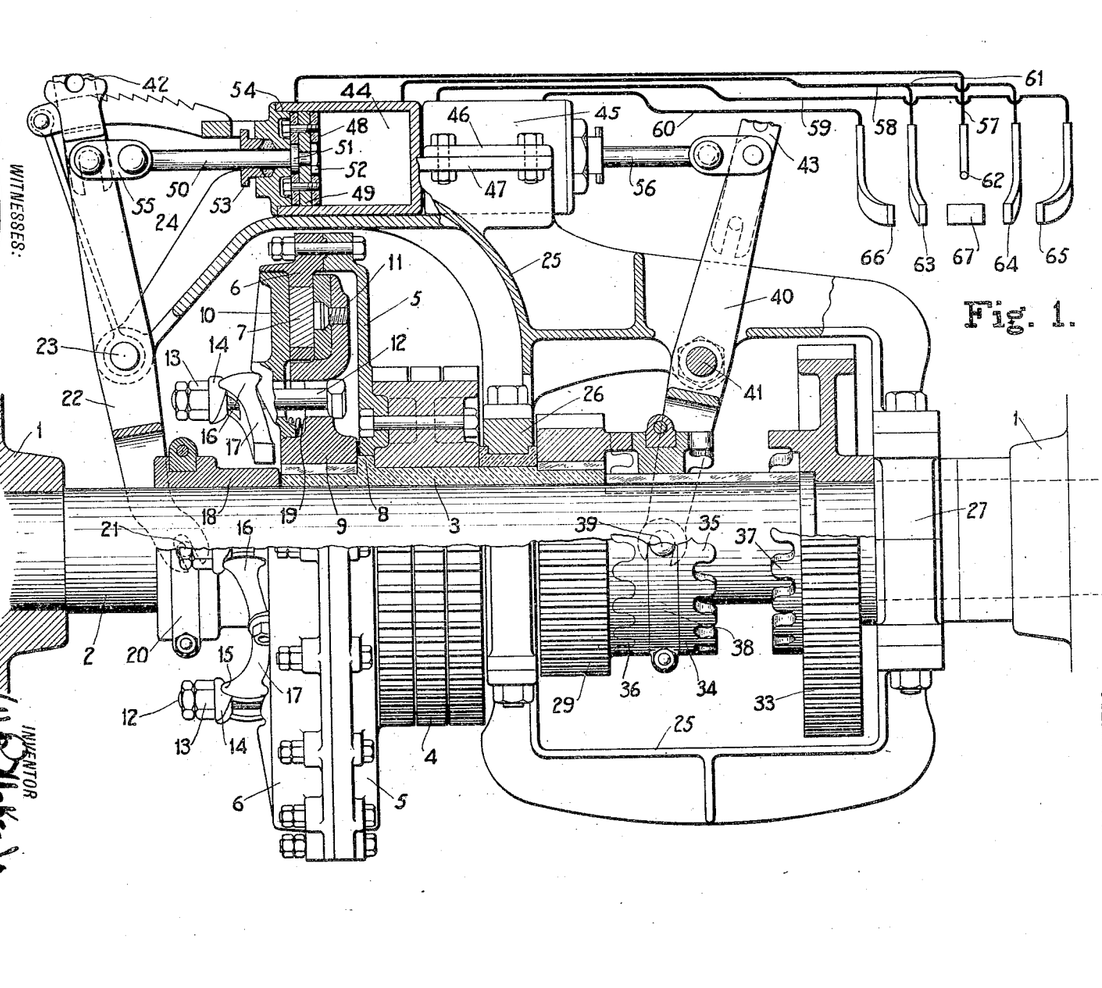
Figure 1 is an elevation of the same, certain parts being broken away to show the structure more clearly and certain parts being diagrammatically represented in order to avoid confusion.

Referring now to Fig. 1 of the accompanying drawings, there are shown truck wheels 1 connected by the axle 2. Loosely mounted upon axle 2 is a sleeve 3 having journaled thereon a sprocket wheel 4 of any desired form which may be connected in any desired manner, as by a sprocket chain, to a source of power. Bolted to gear or sprocket wheel 4 is a clutch-carrier 5 having bolted on its circumference an inwardly-disposed flange 6 provided with wear-blocks 7, as of wood.

Keyed upon sleeve 3 and resting against a shoulder 8 formed thereon is a clutch member 9 comprising, in general, relatively movable outer and inner engaging members 10 and 11 respectively. The part 11 is preferably formed on the member 9 and the outer member 10 is loosely mounted thereon and connected therewith, as by the bolts 12, the heads of which rest against the inner surface of the member 11. Upon the outer ends of bolts 12 there are held, as by lock nuts 13, collars 14 provided with recesses 15. Fitted within each of these recesses and having its opposite end portions taking into a similar recess in the member 10 is the enlarged free end 16 of an actuating lever 17 having its inner end bolted or otherwise connected to a sleeve 18 loosely mounted upon the axle 2.

As the outer portions 16 forked about the bolts 12 are of elongated shape, it will readily be seen that, if the same are rocked, as by a sliding movement of the sleeve 18, the distance between the collars 14 and the member 10 is varied, with a consequent variation in the distance between the opposing surfaces of the outer portions of members 10 and 11, springs 19 being preferably interposed between these parts to take up all lost motion. In this manner, according to the position of the sleeve 18 upon axle 2, the members 10 and 11 are either separated, permitting the flanged part 6 to pass freely between them, or are forced together, thus clamping the flange and locking the carrier 5 to the clutch-member 9 with a degree of firmness corresponding to the intensity of the pressure exerted upon this flange.

Sleeve 18 is provided with a loose ring or band 20 upon which are formed trunnions 21 resting within the slotted ends of a forked actuating-lever 22. The latter is pivoted as at 23 to arms 24 of a rigid frame 25 journaled upon a collar 26 around sleeve 3 and upon the axle at 27. This frame is provided with a laterally projecting portion 28, best shown in Fig. 2, the end of which is resiliently mounted upon the truck-frame in any desired manner.

Figure 2:
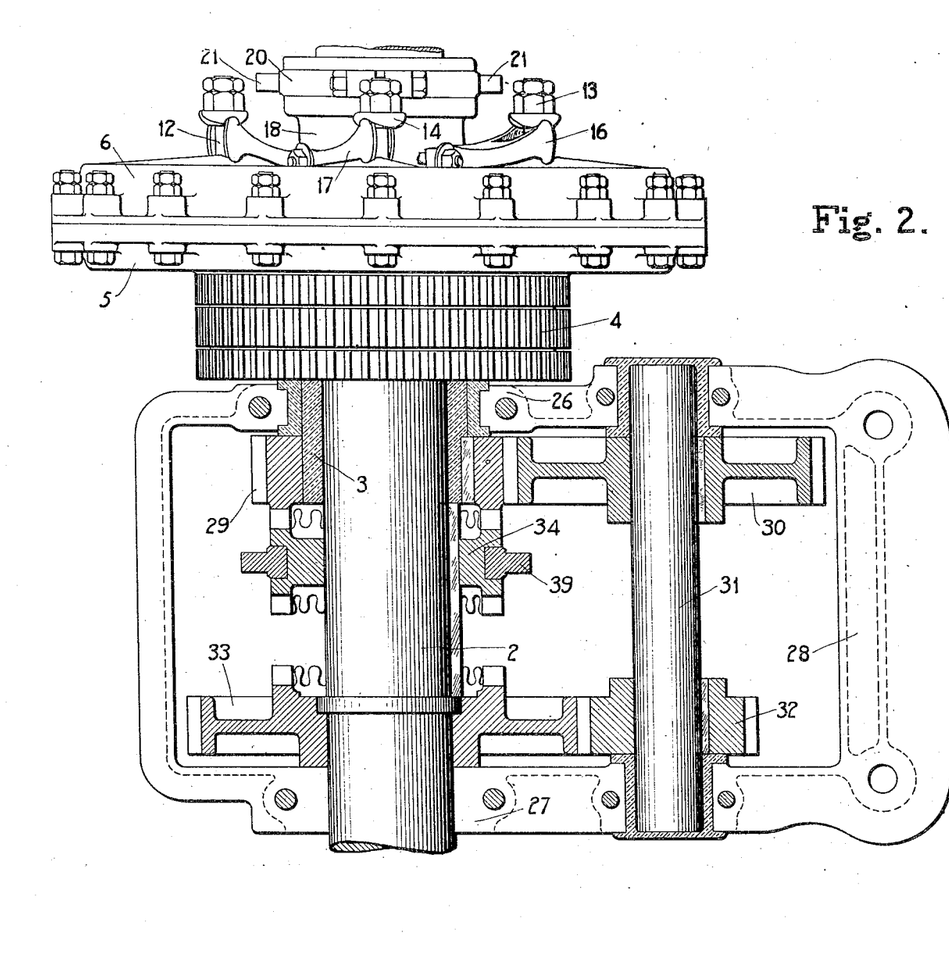
Fig. 2 is a plan partially in section of certain parts shown in Fig. 1.

Keyed upon sleeve 3 is a gear 29 intermeshing with a gear 30 fixed upon a short counter shaft 31 journaled within the extending portion 28 of the frame 25. Likewise fixed upon shaft 31 is a gear 32 intermeshing with a gear 33 loosely mounted upon the axle 2, the proportions of these several gears being such as to drive, or cause to be driven, the gears 29 and 33 at different rates of speed.

Slidably mounted upon the axle 2 and keyed thereto, is a double-faced clutch-member 34 provided with teeth 35 adapted to engage co-acting teeth 36 and 37 upon gears 29 and 33 respectively, the latter members being so spaced as to permit the clutch-member 34 to be thrown into engagement with either one or the other separately or to assume an intermediate position in which it is free from both. It will be noted that the several teeth are slightly undercut, so as to adapt each of the corresponding clutch-members when in engagement automatically to tend to draw the co-acting member toward itself.

The movement of clutch-member 34 is accomplished through a loose ring 38 fitted therein and provided with trunnions 39 resting within slots in the lower end of a forked shipping-lever 40 pivoted to the frame 25 at 41.

Levers 22 and 40 are preferably adapted to receive extensions 42 and 43 by which the same may be manipulated if desired. In the preferred use of the above-described apparatus, however, I employ cylinders 44 and 45 resting within a depressed portion of the frame 25 and rigidly bolted thereto through flanges 46 and 47 respectively formed on these parts. As the construction of these cylinders is substantially identical, that of one only will be herein described. Cylinder 44 is provided with a piston 48 of any desired type having packing means 49 co-acting with the cylinder walls. A piston rod 50 is held upon the piston as by shoulder 51 and nut 52 and passes through a stuffing box 53 of any desired form, the entire head of the cylinder being tapped within the walls as at 54 for the purposes of permitting a ready removal of the piston. The outer end of piston rod 50 is connected with lever 22 as by the link 55, and it will thus be seen that upon the piston being forced from one end of the cylinder to the other, a corresponding movement of the sleeve 18 upon the axle 2 will take place and the friction-clutch will be thrown in or out and to any desired degree, depending upon the direction and force of movement of the piston. In like manner, the piston rod 56 acting within cylinder 45 controls by its position the relation of the double-faced clutch-member 34 to the co-acting parts.

Leading to both ends of both of the cylinders 44 and 45 are conduits 57, 58, 59 and 60, the passage through the conduit 58 being bifurcated as indicated diagrammatically at 61 for a purpose hereinafter described. Conduit 57 leads to a port 62 preferably offset with reference to the ports 63 and 64 connected with the two branches of conduit 58, and the ports 65 and 66 corresponding to the conduits or tubes 59 and 60, the four last-mentioned ports being substantially in alinement.

Between the ports 63 and 64 and substantially in alinement therewith, is an exhaust port 67, the fluid passing through which is carried by any desired means to any desired destination. It may here be noted that by the term "exhaust" as used throughout this specification and the following claims is denoted any means whereby a passage may be provided to a space of relatively low pressure as contradistinguished from the meaning of the expression "source of compressed fluid supply".

Figure 3:
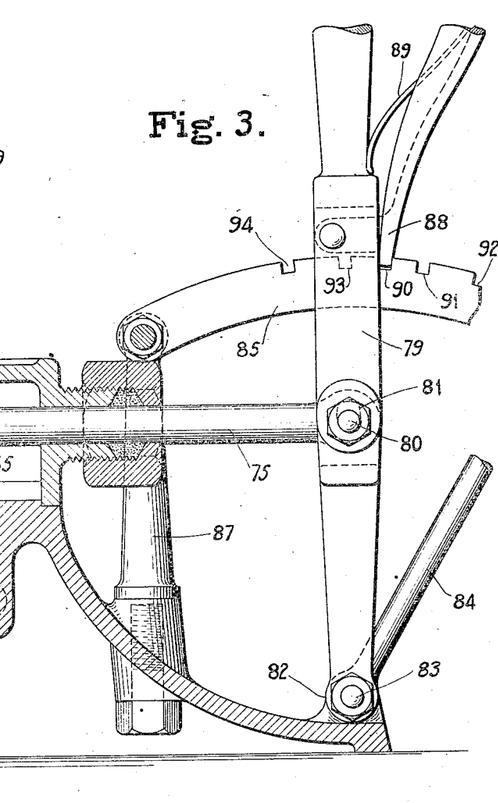
Fig. 3 is a sectional elevation of a controlling valve and operating means therefor.
Figure 4:
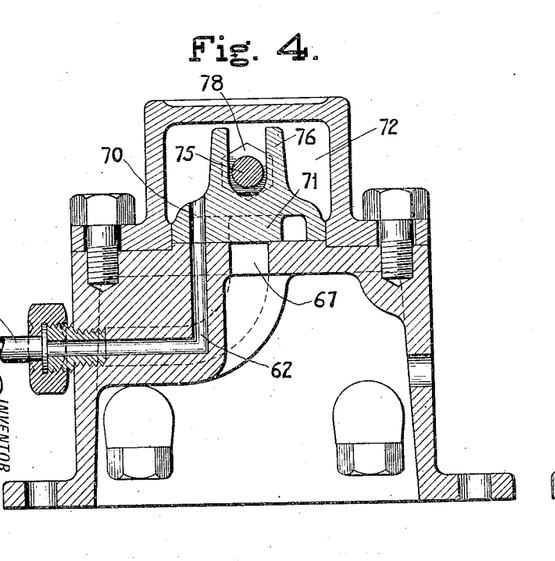
Fig. 4 is a cross section taken on the line $x$—$x$ of Fig. 3.
Figure 7:
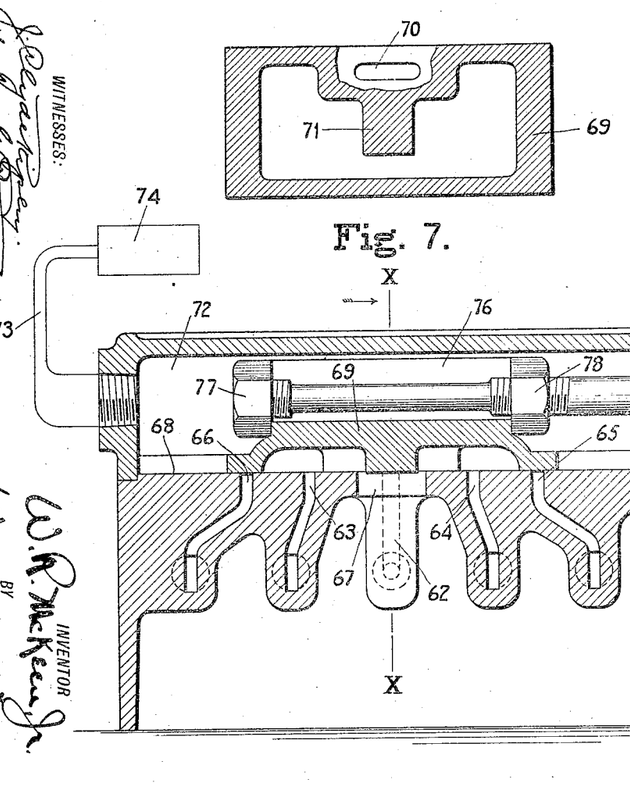
Fig. 7 is a diagrammatic plan of a valve.

Mounted upon the valve-seat 68 is valve 69, preferably of the form shown, which is of a general D shape but is provided with a slot 70 which passes entirely through the valve and is adapted to co-act with the port 62. An inwardly projecting portion 71 is also provided for a purpose hereinafter described, this part being substantially in alinement with the several ports 63, 64, 65 and 66.

Bolted upon the valve-seat 68 is a valve-chest 72 adapted to communicate, as by the conduit or tube 73 with any source of compressed fluid supply 74.

Figure 5:
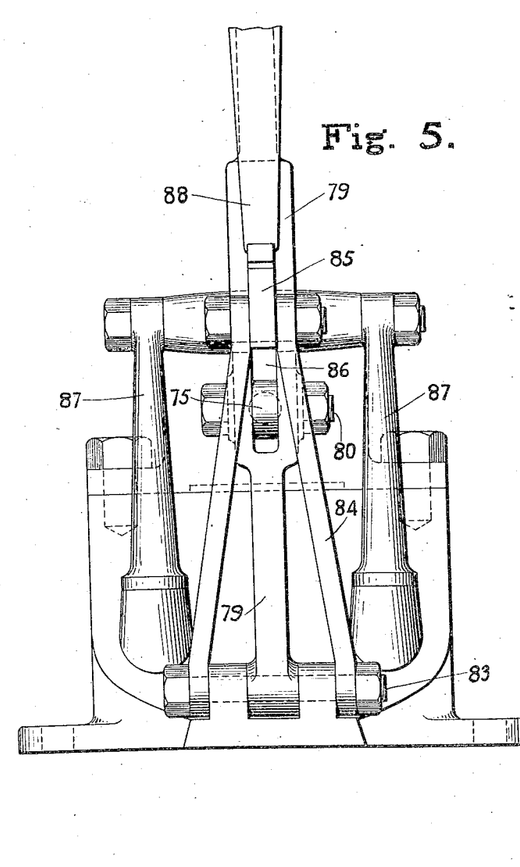
Fig. 5 is an end elevation of the parts shown in Fig. 3.
Figure 6:
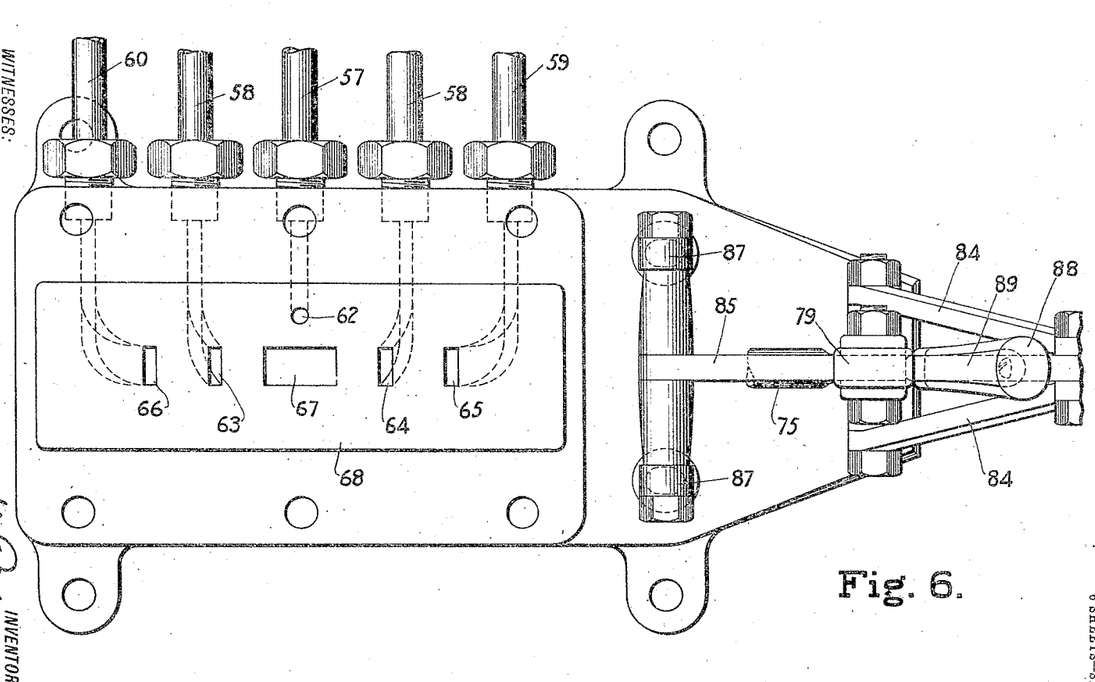
Fig. 6 is a plan of the parts shown in Fig. 3 with the valve and valve-chest removed.

Passing through a suitable stuffing box in the valve-chest 72 is a valve spindle 75 resting between the lugs 76 formed upon the valve and adjustably held in position as by the nuts 77 and 78. The outer end of valve spindle 75 rests within a hand lever 79 and is held as by the bolt 80 passing through the slot 81. The lower end of lever 79 is pivotally mounted at 82 by means of the bolt 83 upon which is likewise mounted a pair of brace rods 84, the upper ends of which converge and are bolted to a locking sector 85 which passes through the slot 86 formed in the lever and is bolted at its inner end to the posts 87.

Pivotally mounted upon hand lever 79 is a latch or dog 88 adapted to co-act with notches formed in the locking sector, a spring 89 being preferably provided to tend to throw the dog into locking position. These notches are preferably five in number, spaced substantially as shown, and the central of these notches 90 corresponds to mid position of the valve shown in Fig. 7 in which the port 62 is open to the valve-chest through the slot 70. Ports 63 and 64 are open to the exhaust port 67, which is of such width as to extend beyond the projection 71, and ports 65 and 66 are covered by the valve. Upon the lever being thrown away from the valve-chest so as to co-act with the notch 91, the valve is thrown into a position shown in Fig.

Figure 8:
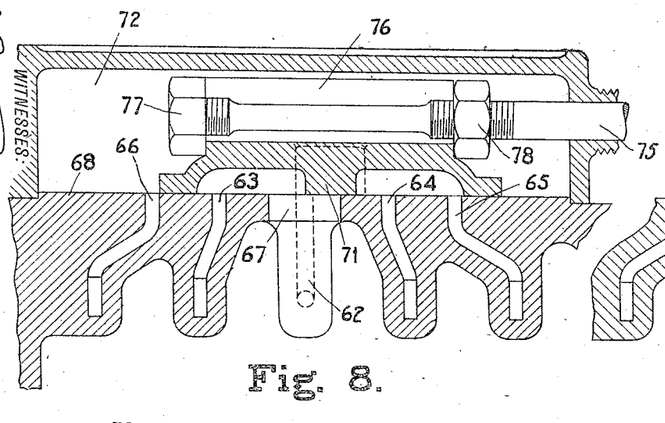
Figs. 8 to 11 inclusive are diagrammatic views showing the valve in different positions.
Figure 9:
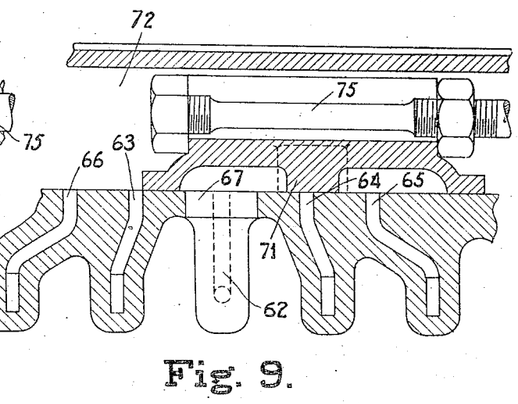

8 in which the ports 66 and 62 are open to the valve-chest and ports 63, 64 and 65 are within the valve and open to the exhaust. If the hand lever now be thrown so as to interlock with the notch 92, the ports 66 and 63 will be open to the valve-chest and, consequently, to the source of fluid supply, the ports 62 and 65 will be in communication with the exhaust, and the port 64 will be covered by the projection 71 upon the valve.

Figure 10:
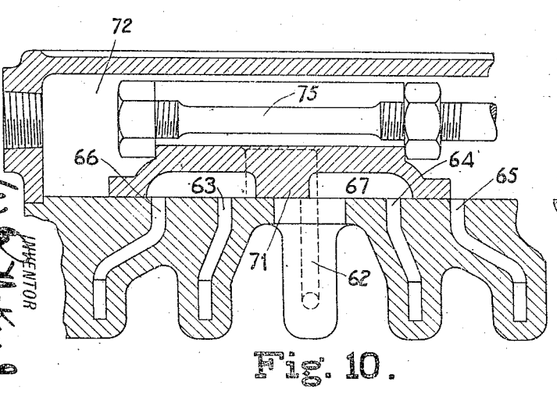
Figure 11:
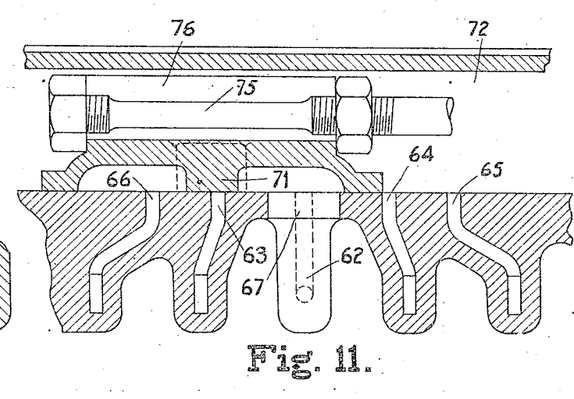

Assuming the lever 79 to be returned to its central position, if it be thrown toward the valve-chest to notch 93, see Fig. 10, ports 63, 64 and 66 are opened to the exhaust, whereas ports 65 and 62 communicate with the valve-chest and, hence, the source of compressed fluid supply. Upon the valve assuming the extreme position, corresponding to the notch 94, as shown in Fig. 11, ports 66 and 62 are opened to the exhaust, ports 64 and 65 are opened to the valve chest, and the port 63 is closed by the projection portion 71.

The above discussion of the several predetermined positions of the valve corresponding to the positions of the lever 79 in which it is locked by dog 88 is given merely to render the construction and relative disposition of the several elements clear, and the functions accomplished by these parts upon being disposed as above described will be hereinafter set forth.

The operation and method of use of the above described embodiment of my invention is substantially as follows: Assuming the lever 79 in mid position co-acting with the notch 90, it will be seen that by reason of the compressed fluid passing through port 62 and conduit 57 to the crank end of the cylinder 44, the piston will be thrown to its innermost position, with a corresponding outward movement of the sleeve 18 which, in this illustrative embodiment, is assumed to effect a release of the friction clutch by inclining the portion 16 of the levers 17 between the members within which it is fitted and thus permitting the same to approach more closely and the members 10 and 11 to be thrown apart, as by the springs 19. The conduit 58 leading to the ports 63 and 64 is, in this case, open to the exhaust, and the movement of piston 48 thus unopposed. By reason of the covering of the ports 65 and 66, the piston in cylinder 45 is forced in neither direction, with the valve disposed as above and clutch-member 34 may be assumed to be in mid position. If now the lever 79 be moved to the notch 91, the port 66 is open to the pressure and the port 65 to the exhaust, the connections of the other ports remaining unchanged by reason of the elongated slot 70 with which the port 62 co-acts. As a result of this operation, the piston in cylinder 45, pressure being admitted to one side thereof and the other side being opened to the exhaust, is instantly thrown in such direction as to cause the clutch-member 34 to engage with the co-acting parts upon gear 33, and hence complete the transmission at the lower speed from the friction clutch to the wheels 1. The latter clutch, however, is, as above explained, in open condition, and no power is transmitted to the co-acting clutch teeth, thus avoiding undue stress and the chance of stripping the same. In order, however, to cushion such shock as may be occasioned by the momentum of the parts, assuming the same to be rotating idly, the entire frame 25 is adapted to tend to swing about the axle 2 and is resiliently mounted upon the truck as above described, thus permitting a slight movement of the entire back gearing about the axle and tending to cushion any shock brought upon the positive clutch-members due to difference in speed of the same when thrown into engagement. Upon the lever 79 being thrown to the extreme notch 92, the port 63 is opened to the pressure, ports 62 and 65 to the exhaust, and port 64 covered as above described by the projection 71, thus preventing the blowing of compressed-air or other fluid through the two legs of the conduit 58 directly from the source of supply to the exhaust. Owing to conduit 58 being thus opened to the pressure and conduit 57 to the exhaust, the piston 48 is thrown to the opposite end of the cylinder and the friction clutch thrown in by reason of the clamping of the flange 6 as above set forth. Upon lever 79 being returned to mid position, the friction clutch is first thrown off and the communication of the cylinder 45 with the pressure, closed, as above set forth. Upon moving the hand lever in the opposite direction from its mid position, a series of operations take place which is substantially identical with that above described, with the exception that the connections of the ports 65 and 64 are reversed, resulting in the throwing of the clutch member 34 in the opposite direction, and the transmission of power at the higher speed; it being assumed that gear 33 is driven more slowly than gear 29.

It will thus be seen that I have provided means whereby the several objects of my invention are fully accomplished, and that these means are of the simplest and yet most efficient construction. By mere manipulation of a single lever, the speed is first determined and the power then thrown on, and if it be desired to change this speed, the power is thrown off, the speed changed, and the power thrown on again, these means acting automatically to provide the operations in the above sequence. No effort is required, moreover, to throw the parts of the heaviest transmission and the controlling as well as active parts of this transmission are as compactly disposed as is consistent with the highest efficiency and the desired readiness of access. The entire mechanism, while possessing advantageous features capable of broad application, is nevertheless peculiarly adapted for use in connection with the previously-mentioned art, many of the defects of which it is well adapted to eliminate.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein-described and all statements of the scope of the invention, which, as a matter of language, might be said to fall therebetween.

Certain features herein shown and described are shown, described and claimed in my co-pending case, filed December 19, 1905, Serial No. 292,447, and accordingly are not claimed herein.

Having described my invention, what I claim as new and desire to secure by Letters Patent is:

1. In mechanism of the class described, in combination, a car-truck comprising wheels and an axle, a driving member upon said axle, a friction clutch upon said axle extending in a plane transverse thereto and adapted to transmit power from said driving member to said wheels, a cylinder, a piston within said cylinder connected to and adapted to actuate said friction clutch, means provided with a pair of passages respectively leading to said cylinder at each side of said piston, a source of compressed fluid supply, and a single means adapted at will to admit fluid from said source of supply through either of said passages.

2. In mechanism of the class described, in combination, a car-truck comprising wheels and an axle, a driving member upon said axle, a friction clutch upon said axle adapted to transmit power from said driving member to said wheels, said friction clutch extending in a plane substantially transverse to said axle, levers adapted to actuate said friction clutch lying substantially in a plane transverse to said axle, a cylinder, a piston within said cylinder connected with and adapted to actuate said levers, means provided with passages leading respectively to said cylinder at each side of said piston, a source of compressed fluid supply, and a single means adapted at will to admit fluid from said source of supply through either of said passages.

3. In mechanism of the class described, in combination, a car-truck comprising wheels and an axle, a driving member, a gear upon said axle connected with said driving member, a second gear upon said axle, gearing connecting said gears adapted to drive the same at different rates of speed, a double-faced clutch member upon said axle adapted to be thrown into engagement with co-acting parts upon either of said gears, said clutch member being adapted to transmit power from said driving member to said wheels, a cylinder, a piston within said cylinder connected with and adapted to throw said double-faced clutch member, means provided with passages leading respectively to said cylinder at each side of said piston, a source of compressed fluid supply, and a single means adapted at will to admit fluid from said source of supply through either of said passages.

4. In mechanism of the class described, in combination, a car-truck comprising wheels and an axle, a driving member, a gear upon said axle connected with said driving member, a second gear upon said axle, gearing connecting said gears adapted to drive the same at different rates of speed, a double-faced clutch member upon said axle adapted to be thrown into engagement with co-acting parts upon either of said gears, said clutch member being adapted to transmit power from said driving member to said wheels, a cylinder, a piston within said cylinder connected with and adapted to throw said double-faced clutch member, means provided with passages leading respectively to said cylinder at each side of said piston, a source of compressed fluid supply, and means adapted at will to admit fluid from said source of supply through either of said passages, the other being opened to the exhaust.

5. In mechanism of the class described, in combination, a car-truck comprising wheels and an axle, a driving member, a gear upon said axle connected with said driving member, a second gear upon said axle, gearing connecting said gears adapted to drive the same at different rates of speed, a double-faced clutch member upon said axle adapted to be thrown into engagement with co-acting parts upon either of said gears, said clutch member being adapted to transmit power from said driving member to said wheels, a cylinder, a piston within said cylinder connected with and adapted to throw said double-faced clutch member, means provided with passages leading respectively to said cylinder at each side of said piston, a source of compressed fluid supply, and means adapted at will to admit fluid from said source of supply through either of said passages, said gearing being resiliently mounted upon the frame of said truck.

6. In mechanism of the class described, in combination, a car-truck comprising wheels and an axle, a driving member, a gear mounted upon said axle connected with said driving member, a second gear mounted upon said axle, gearing connecting said gears and adapted to drive the same at different rates of speed, a double-faced clutch member mounted upon said axle adapted to be thrown into engagement with co-acting parts upon either of said first-mentioned gears, a supporting frame upon which said gearing is mounted, means resiliently supporting a portion of said frame upon the frame of said truck, a cylinder mounted upon said frame, a piston within said cylinder, means connecting said piston with said double-faced clutch member, means provided with passages leading to said cylinders at each side of said piston respectively, a source of compressed fluid supply, and means adapted at will to admit fluid from said source of supply through either of said passages.

7. In mechanism of the class described, in combination, a car-truck comprising wheels and an axle, a driving member, a gear mounted upon said axle connected with said driving member, a second gear mounted upon said axle, gearing connecting said gears and adapted to drive the same at different rates of speed, a double-faced clutch member mounted upon said axle adapted to be thrown into engagement with co-acting parts upon either of said first-mentioned gears, a supporting frame upon which said gearing is mounted, means resiliently supporting a portion of said frame upon the frame of said truck, a cylinder mounted upon said frame, a piston within said cylinder, means connecting said piston with said double-faced clutch member, means provided with passages leading to said cylinders at each side of said piston respectively, a source of compressed fluid supply, and means adapted at will to admit fluid from said source of supply through either of said passages, said connecting means between said piston and said double-faced clutch member comprising a lever pivoted upon said supporting frame.

8. In mechanism of the class described, in combination, a car-truck comprising wheels and an axle, a driving member, a friction clutch upon said axle extending in a plane transverse thereto adapted to control the transmission of power from said driving member to said wheels, a gear upon said axle connected with said driving member through said friction clutch, a second gear upon said axle, gearing connecting said gears adapted to drive the same at different rates of speed, a supporting frame upon which said gearing is mounted, a pair of cylinders mounted upon said frame, a double-faced clutch member upon said axle adapted to be thrown into engagement with co-acting parts upon either of said gears, pistons within said cylinders respectively connected with and adapted to actuate said double-faced clutch member and said friction clutch, means provided with a passage leading to each of said cylinders at each side of said pistons, a source of compressed fluid supply, and means adapted to admit fluid from said source of supply through any of said passages at will.

9. In mechanism of the class described, in combination, a car-truck comprising wheels and an axle, a driving member, a friction clutch upon said axle extending in a plane transverse thereto adapted to control the transmission of power from said driving member to said wheels, a gear upon said axle connected with said driving member through said friction clutch, a second gear upon said axle, gearing connecting said gears adapted to drive the same at different rates of speed, a supporting frame upon which said gearing is mounted, a pair of cylinders mounted upon said frame, a double-faced clutch member upon said axle adapted to be thrown into engagement with co-acting parts upon either of said gears, pistons within said cylinders respectively connected with and adapted to actuate said double-faced clutch member and said friction clutch, means provided with a passage leading to each of said cylinders at each side of said pistons, a source of compressed fluid supply, and means adapted to admit fluid from said source of supply through any of said passages at will, a portion of said supporting frame being resiliently mounted upon the frame of said truck.

10. In mechanism of the class described, in combination, a car-truck comprising wheels and an axle, a driving member, a friction clutch upon said axle extending in a plane transverse thereto adapted to control the transmission of power from said driving member to said wheels, a gear upon said axle connected with said driving member through said friction clutch, a second gear upon said axle, gearing connecting said gears adapted to drive the same at different rates of speed, a supporting frame upon which said gearing is mounted, a pair of cylinders mounted upon said frame, a double-faced clutch member upon said axle adapted to be thrown into engagement with co-acting parts upon either of said gears, pistons within said cylinders respectively connected with and adapted to actuate said double-faced clutch member and said friction clutch, means provided with a passage leading to each of said cylinders at each side of said pistons, a source of compressed fluid supply, and means adapted to admit fluid from said source of supply through any of said passages at will, said connecting means between said pistons and the clutch mechanisms comprising levers pivoted upon said frame.

11. In mechanism of the class described, in combination, a car-truck comprising wheels and an axle, power-controlling means mounted upon said axle, speed-changing means mounted upon said axle, a supporting-frame mounted upon said axle, and levers pivoted to said frame adapted respectively to control said power-controlling and said speed-changing means.

12. In mechanism of the class described, in combination, a car-truck comprising wheels and an axle, power-controlling means mounted upon said axle, speed-changing means mounted upon said axle, a supporting frame mounted upon said axle, levers pivoted to said frame adapted respectively to control said power-controlling and said speed-changing means, a pair of cylinders mounted upon said frame, pistons within said cylinders connected with said levers, a source of compressed fluid supply, means adapted to connect said cylinders with said source of compressed fluid supply, and means controlling the admission of fluid from said source of supply to said cylinders and the actuation of said power-controlling and speed-changing means.

13. In mechanism of the class described, in combination, a car-truck comprising wheels and an axle, power-controlling means mounted upon said axle, speed-changing means mounted upon said axle, a supporting frame mounted upon said axle, levers pivoted to said frame adapted respectively to control said power-controlling and said speed-changing means, a pair of cylinders mounted upon said frame, pistons within said cylinders connected with said levers, a source of compressed fluid supply, means adapted to connect said cylinders with said source of compressed fluid supply, and single means controlling the admission of fluid from said source of supply to said cylinders and the actuation of said power-controlling and speed-changing means.

14. In mechanism of the class described, in combination, a car-truck comprising wheels and an axle, power-controlling means mounted upon said axle, speed-changing means mounted upon said axle, a supporting frame mounted upon said axle, levers pivoted to said frame adapted respectively to control said power-controlling and said speed-changing means, a pair of cylinders mounted upon said frame, pistons within said cylinders connected with said levers, a source of compressed fluid supply, means adapted to connect said cylinders with said source of compressed fluid supply, and single means controlling the admission of fluid from said source of supply to said cylinders and the actuation of said power-controlling and speed-changing means, said frame having mounted thereon a portion of said speed-changing means and being adapted to swing with reference to said axle and having a portion thereof resiliently mounted upon the frame of said truck.

In testimony whereof I affix my signature, in the presence of two witnesses.

WILLIAM R. McKEEN, Jr.

Witnesses:
ARTHUR H. FETTERS,
JAMES G. HOPE.